US007587392B2

(12) United States Patent
Jhaveri et al.

(10) Patent No.: US 7,587,392 B2
(45) Date of Patent: Sep. 8, 2009

(54) EFFICIENT NAVIGATION OF SEARCH RESULTS

(75) Inventors: Vivek J. Jhaveri, Seattle, WA (US); Robert Ragno, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 221 days.

(21) Appl. No.: 11/532,369

(22) Filed: Sep. 15, 2006

(65) Prior Publication Data

US 2008/0071743 A1 Mar. 20, 2008

(51) Int. Cl.
*G06F 17/30* (2006.01)

(52) U.S. Cl. ................................ 707/3; 707/4; 715/781; 715/788

(58) Field of Classification Search ..................... 707/1, 707/10, 104.1; 715/788, 781
See application file for complete search history.

(56) References Cited

U.S. PATENT DOCUMENTS

| | | | |
|---|---|---|---|
| 6,281,899 | B1 | 8/2001 | Gould et al. |
| 7,007,074 | B2 | 2/2006 | Radwin |
| 7,031,961 | B2 | 4/2006 | Pitkow et al. |
| 2004/0059708 | A1 | 3/2004 | Dean et al. |
| 2004/0122811 | A1 | 6/2004 | Page |
| 2004/0172595 | A1 | 9/2004 | Lerner et al. |
| 2005/0149576 | A1 | 7/2005 | Marmaros et al. |
| 2005/0228775 | A1 | 10/2005 | Nilsen et al. |
| 2006/0026064 | A1 | 2/2006 | Collins |
| 2006/0059440 | A1 | 3/2006 | Pry |
| 2006/0070012 | A1 | 3/2006 | Milener et al. |
| 2006/0123042 | A1 | 6/2006 | Xie et al. |
| 2006/0294475 | A1* | 12/2006 | Holecek et al. ............. 715/781 |
| 2007/0250788 | A1* | 10/2007 | Rigolet ....................... 715/788 |

FOREIGN PATENT DOCUMENTS

| | | |
|---|---|---|
| WO | 2000077681 | 12/2000 |
| WO | 2006038280 | 4/2006 |

OTHER PUBLICATIONS

Thomas Klement, Matthias Hemmje, "Metadata for Multidimensional Categorization and Navigation Support on Multimedia Documents", German National Research Center for Information Technology (GMD), Integrated Publication and Information Systems Institute (IPSI), [klement, hemmje]@darmstadt.gmd.de.

(Continued)

*Primary Examiner*—Yicun Wu
(74) *Attorney, Agent, or Firm*—Shook, Hardy & Bacon LLP

(57) ABSTRACT

Systems, methods, and computer-readable media for navigating search results are provided. In response to receiving a search query, at least one individual search result is presented in an overlay window, the overlay window being configured to overlay at least a portion of a document viewing window. Navigation between the overlay window and the document viewing window may be performed in response to receiving input of at least one pre-determined command. Content associated with a selected individual search result (or other document identifier) may be presented in the document viewing window and, substantially simultaneously, the overlay window may be hidden from view. Subsequently, in response to receiving at least one pre-determined command, the overlay window may be re-presented such that it again overlays at least a portion of the document viewing window.

3 Claims, 4 Drawing Sheets

OTHER PUBLICATIONS

"LookSmart: Where To Look For What You Need", http://aboutus.looksmart.com/.

Dale Newfield, Bhupinder Singh Sethi, Kathy Ryall, "Scratchpad: Mechanisms for Better Navigation in Directed Web Searching", Computer Science Department, Thornton Hall, University of Virginia, Charlottesville, VA 22903-2442 USA, {DNewfield,bss4k,Ryall}@cs.virginia.edu.

Zan Sun, Amanda Stent, I.V. Ramakrishnan, "Dialog Generation for Voice Browsing", Department of Computer Science, Stony Brook University, Stony Brook, NY 11794, USA, {zsun, stent, ram}@cs.sunysb.edu.

Hao Chen, Susan Dumais, "Bringing Order to the Web: Automatically Categorizing Search Results", Conference on Human Factors in Computing Systems, Archive Proceedings of the SIGCHI Conference on Human Factors in Computing Systems, pp. 145-142, Year of Publication: 2000, see the abstract, figure 3, "Information Overlays" and "Methods" parts.*

"Display of Search Results in Google-based Yahoo! vs. LCC&K Interfaces: A Comparison Study", Journal of Information Science, vol. 31, Issue 3, pp. 164-177, Jun. 2005, see the abstract, figure 1, "Introduction" part.*

Tim Paek, Susan Dumais, Ron Logan, "Wavelens: A New View onto Internet Search Results", CHI 2004, Apr. 24-29, 2004, see the abstract, figures 1-2, "Fisheye zooming" part.*

International Search Report dated Jan. 7, 2008.*

* cited by examiner

EFFICIENT NAVIGATION OF SEARCH RESULTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Conventionally, searching document sets for content related to a particular keyword or topic of interest involves a user inputting a search query into the appropriate field of a search engine query page or a search tool bar. In response, search results (which may include a title, brief description, one or more links, one or more thumbnails, or the like) are typically retrieved and displayed in a document viewing window or a search results pane. A user desiring to view the content associated with a particular search result may select the desired result causing the document viewing window to navigate to an initial document, e.g., a web page, associated therewith. In many cases, the user spends some time viewing the initial document and/or other documents linked to the initial document. If the user decides to return to the search results and, potentially, view another search result, the user must return to the document viewing window containing the search results, typically by navigating backwards in the document viewing window through all documents that have been viewed since the most recent search result selection. Backward navigations may take some time if the user has viewed content associated with a number of documents since most recently selecting a search result, such documents either being traceable through links back to the initial document or having separately input identifiers (e.g., web site addresses).

Such navigation back to the search results has a number of drawbacks. For instance, some of the viewed documents may be programmed to be displayed in a document viewing window separate from the window from which they were selected. This may result in multiple document viewing windows being open simultaneously, crowding the user's desktop space. Additionally, document viewing windows are typically configured to present only a limited number of search results at a time, thereby requiring the user to navigate to a subsequent document to view additional search results. This is not only inefficient but makes it difficult for the user to easily ascertain the quantity of returned search results and/or the relevance of any particular individual search result. In current search environments, therefore, the user is often forced to expend much of their time and effort navigating through the search results to find what the user desires to learn.

Search results displayed in a search results pane rather than a document viewing window alleviate some of the difficulties associated with document viewing window-displayed search results. For instance, the search results pane may remain visible to the user at all times alleviating the need for backward navigation through a series of viewed documents. However, as the search results pane is always visible to the user, it takes up a portion of the display area available for displaying selected documents, thus making the displayed content more difficult for a user to see.

SUMMARY

Embodiments of the present invention provide systems, methods, and computer-readable media for navigating search results. In one embodiment, one or more individual search results are presented in an overlay window that overlays at least a portion of a document viewing window in response to receiving a search query. When an individual search result is selected, the content associated with the selected individual search result is presented in the document viewing window and the overlay window is hidden from view. The overlay window may then be re-presented in response to receiving a pre-determined command for navigating within or selecting from the individual search results.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
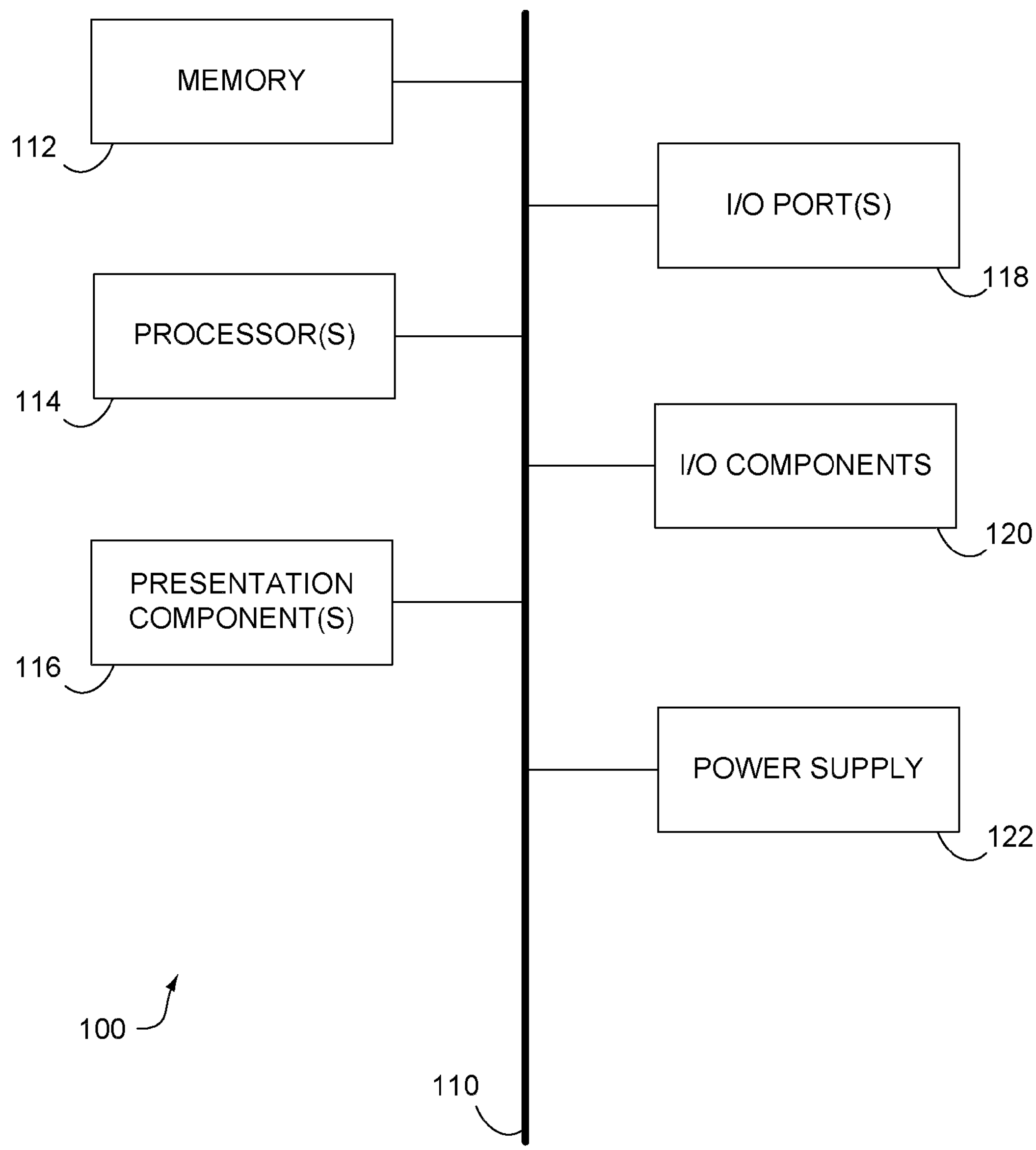
FIG. 1 is a block diagram of an exemplary computing system environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide systems, methods, and computer-readable media for navigating search results. The systems, methods, and computer-readable media disclosed herein improve the efficiency of document searching by providing, among other things, an easy way to navigate within and select from a list of search results and an easy way to return to a search results list, if desired.

Accordingly, one embodiment of the present invention is directed to a method for navigating search results. The method includes receiving a search query; in response to the search query, presenting an overlay window having at least one individual search result presented therein, the overlay window overlaying at least a portion of a document viewing window; and navigating between the overlay window and the document viewing window upon receiving input of one or more pre-determined commands.

In another embodiment, the present invention is directed to one or more computer readable media having computer-executable instructions embodied thereon for performing a method for navigating search results. The method includes receiving a search query; in response to the search query, presenting an overlay window having at least one individual search result presented therein, the overlay window overlaying at least a portion of a document viewing window; presenting, in the document viewing window, content associated with a document, wherein upon such presentation, the overlay window is hidden from view; receiving a first pre-determined command to re-present the overlay window; and in response to the received first pre-determined command, re-presenting the overlay window such that the overlay window overlays at least a portion of the document viewing window.

In yet another embodiment, the present invention is directed to a system for navigating search results. The system includes a presentation module configured to present a plurality of individual search results in an overlay window in response to receiving a search query, the overlay window overlaying at least a portion of a document viewing window; and a navigation control module configured to navigate among the plurality of individual search results in response to receiving a pre-determined command.

Having briefly described an overview of embodiments of the present invention, an exemplary operating environment is described below.

Referring to the drawing figures in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the present invention may be described in the general context of computer code or machine-useable instructions, including computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including, but not limited to, hand-held devices, consumer electronics, general purpose computers, specialty computing devices, and the like. Embodiments of the invention may also be practiced in distributed computing environments where tasks are performed by remote processing devices that are linked through a communications network. In a distributed computing environment, program modules may be located in association with both local and remote computer storage media including memory storage devices. The computer useable instructions form an interface to allow a computer to react according to a source of input. The instructions cooperate with other code segments to initiate a variety of tasks in response to data received in conjunction with the source of the received data.

Computing device 100 includes a bus 110 that directly or indirectly couples the following elements: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. Thus, it should be noted that the diagram of FIG. 1 is merely illustrative of an exemplary computing device that may be used in connection with one or more embodiments of the present invention. Distinction is not made between such categories as "workstation," "server," "laptop," "hand held device," etc., as all are contemplated within the scope of FIG. 1 and reference to the term "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer storage media in the form of volatile and/or nonvolatile memory. The memory may be removable, nonremovable, or a combination thereof Exemplary hardware devices include solid state memory, hard drives, optical disc drives, and the like. Computing device 100 includes one or more processors that read data from various entities such as memory 112 or I/O components 120. Presentation component(s) 116 present data indications to a user or other device. Exemplary presentation components include a display device, speaker, printing component, vibrating component, and the like.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
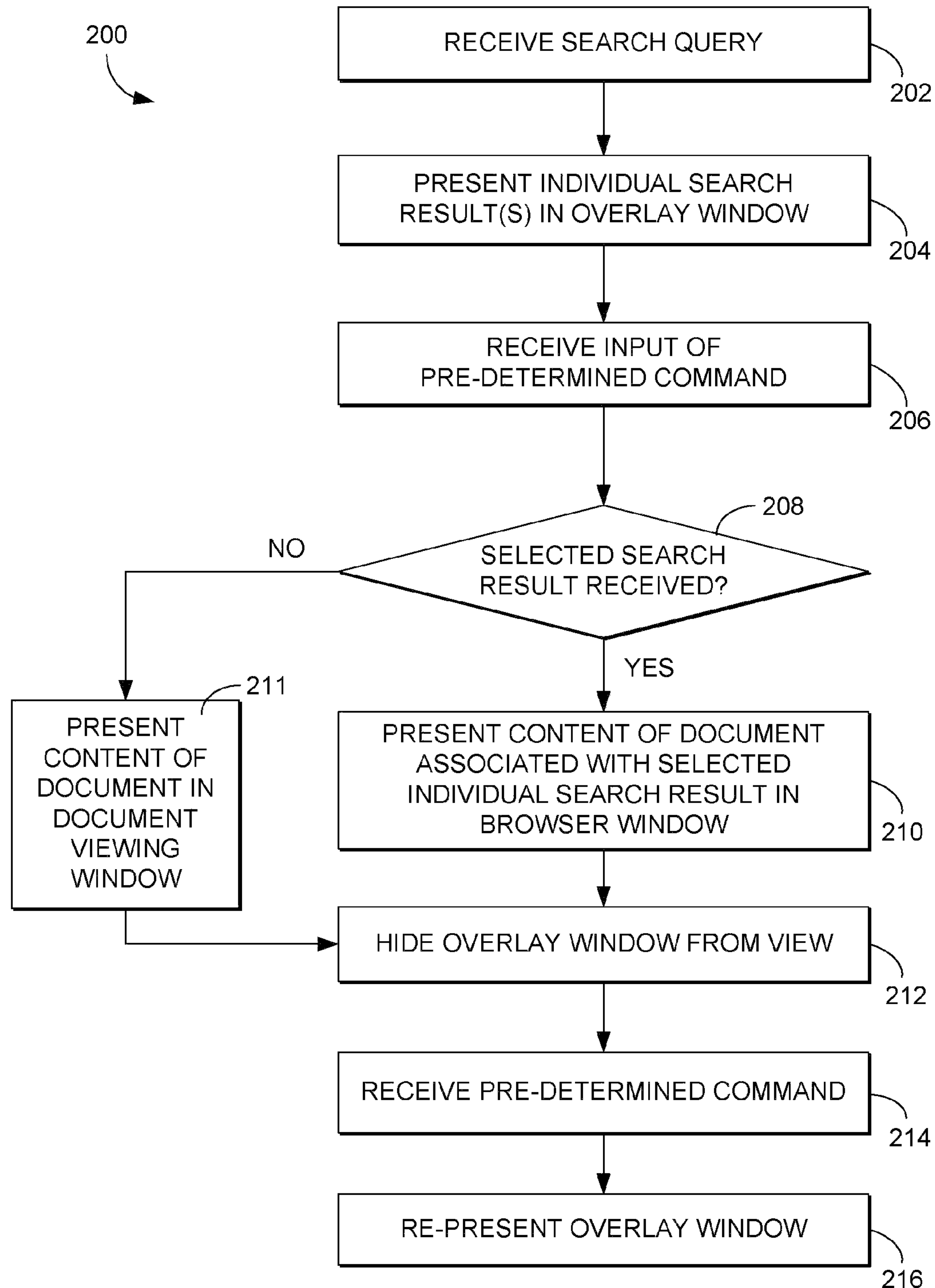
FIG. 2 is a flow diagram illustrating an exemplary method for navigating between an overlay window containing search results and a document viewing window, in accordance with an embodiment of the present invention.

Turning now to FIG. 2, a flow diagram of an exemplary method for navigating between an overlay window containing at least one individual search result and a document viewing window, in accordance with an embodiment of the present invention, is illustrated and designated generally as reference numeral 200. Initially, as indicated at block 202, a search query is received. Search queries may be received through a variety of mechanisms including, but not limited to, user input into the appropriate field of a search engine web site or search toolbar.

In response to receiving the search query, at least one individual search result is retrieved (e.g., from a database 406, as more fully described below with reference to FIG. 4) and presented in an overlay window, as indicated at block 204. Typically, a plurality of individual search results is retrieved and presented in the overlay window. In such embodiments, the overlay window may present only a portion of the individual search results within the desktop viewing area. However, the overlay window may be configured such that all individual search results are present on a single document and may be accessible by scrolling through the list without the need to navigate to a subsequent document viewing window page.

Typically, the overlay window overlays at least a portion of a document viewing window in association with which content associated with the search result(s) and/or another document may be presented, as more fully described below. In some embodiments, the overlay window may be resized or moved around within a desktop display space as desired.

Subsequently, as indicated at block 206, input of a predetermined command indicative of a desired action is received. In some embodiments, the pre-determined command may be a combination of keyboard characters selected simultaneously (e.g., pressing the Control and the Tab buttons together), a combination of keyboard characters selected in succession (e.g., pressing the Alternate (Alt) button followed by pressing the Tab button), a single keyboard character (e.g., pressing the Escape button), a mouse click (e.g., a right mouse click and release, a left mouse click and hold, etc.), or any combination thereof For example, a right mouse click and release on an individual search result may be programmed for selecting the individual search result.

As indicated at block 208, the input of the pre-determined command is next examined to determine whether the input relates to selection of one of the individual search results. If it is determined that the input relates to selection of one of the individual search results, any content associated with the selected individual search result is presented in the document viewing window, as indicated at block 210. In some embodiments, the individual search result may include one or more of a link to a web site, a document preview, a thumbnail, a video preview sample or a representative icon thereof, an audio sample or a representative icon thereof, or any combination thereof If the selected individual search result is a link to a web site, for example, the content of the website may be presented in the document viewing window. Upon presentation of the content associated with the individual search result, the overlay window is hidden from view, as indicated at block 212. Thus, advantageously, the search results occupy no display space when they are not being utilized.

If, at block 208, it is determined that the pre-determined command does not relate to selection of the individual search result but, for instance, to an identifier for a different, the content of such document may be presented in the document viewing window, as indicated at block 211. Alternatively, in those instances where a search query is received via input into an appropriate field of a document viewing window, it may be determined that the pre-determined command relates to a desire to return to the content of the document viewing window itself This may occur, for instance, if the user desires to modify his or her search query. In such instances, the content of the document viewing window may be re-presented in response to the pre-determined command. Any and all such variations, and any combinations thereof, are contemplated to be within the scope of embodiments of the present invention.

Figure 3:
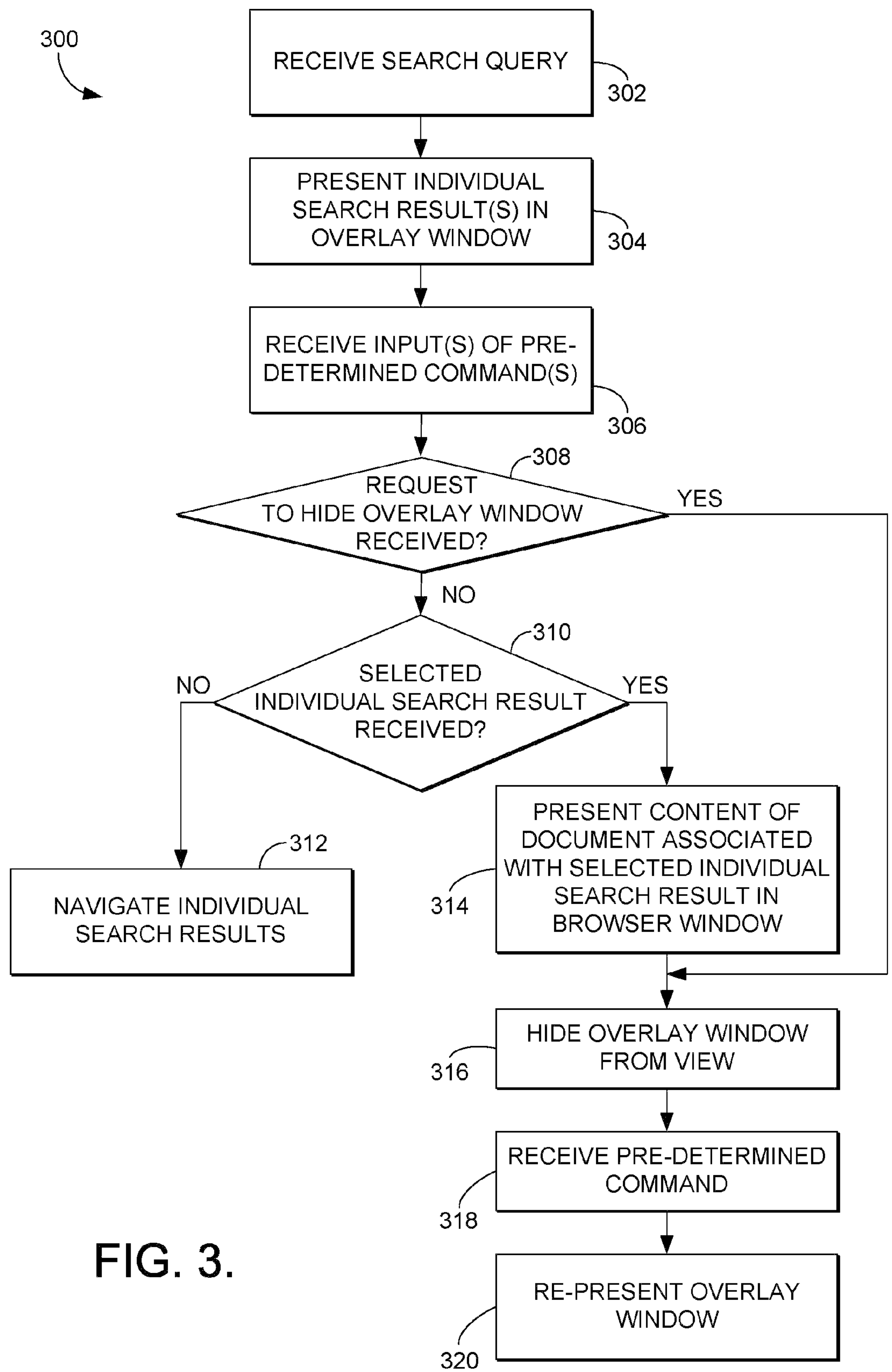
FIG. 3 is a flow diagram of an exemplary method for navigating search results, in accordance with an embodiment of the present invention.

After the user completes examination of the presented content, s/he inputs a pre-determined command to indicate that the overlay window is to be re-presented. Receipt of such pre-determined command is indicated at block 214. Subsequent to receiving the pre-determined command, the overlay window is re-presented, as indicated at block 216. In some embodiments, a previously selected individual search result may be visibly marked or otherwise identified, e.g., by highlighting the result or the like. In some embodiments, all previously selected individual search results are visibly identified. In such embodiments, the most recently selected individual search result may be identified differently from the rest of the previously selected individual search results, such that user may readily view where in the list of individual search results s/he left off Turning now to FIG. 3, a flow diagram of an exemplary method for navigating search results, in accordance with an embodiment of the present invention, is illustrated and designated generally as reference numeral 300. Initially, as indicated at block 302, a search query is received. Search queries may be received, for instance, through search engine web sites and/or search tool bars. In response to receiving the search query, one or more individual search results is presented in an overlay window, as indicated at block 304. In some embodiments, the list includes at least one sponsored individual search result and at least one non-sponsored individual search result. In such embodiments, sponsored individual search results may be presented such that they are easily distinguished from non-sponsored individual search results, e.g., listed at the top of a vertically oriented list and/or presented in a different typeface or color than the non-sponsored results.

Subsequently, as indicated at block 306, input of at least one pre-determined command is received. In some embodiments, the input may include a selected individual search result, a request to hide the overlay window from view (e.g., if the user desires to modify the search query), a request to navigate to a subsequent individual search result, a request to navigate to a previous individual search result, a request to navigate within an individual search result, a request to re-present the overlay window, a request to navigate to a web site unrelated to any individual search result, and any combination thereof.

As indicated at block 308, the input of the at least one pre-determined command is subsequently examined to determine whether the input was indicative of a request to hide the overlay window from view. Such request may be received, e.g., if a user entered the search query in a document viewing window and desires to modify the search query. If the input is indicative of a request to hide the overlay window, the overlay window is hidden from view, as indicated at block 316. If not, however, the input is further examined to determine whether selection of an individual search result is received. This is indicated at block 310. If the input does not contain selection of an individual search result, then it is determined that the input relates to a request to navigate within the list of individual search results and/or within any one of the individual search results. Accordingly, as indicated at block 312, the search results are navigated in accordance with the request.

In some embodiments, navigation begins at a non-sponsored individual search result. In some embodiments, navigation begins at the most recently selected individual search result. In some embodiments, an individual search result includes one or more links to related web sites. In such embodiments, the links within the individual search result also may be navigated upon input of a pre-determined command. In some embodiments, one or more individual search results may be visibly identified as important. In some embodiments, a list of individual search results that are visibly identified as important can be saved. For example, a user may mark one or more search results as important and save them in a search folder by pressing and releasing the F1 button while pressing and holding the Control button.

If, at block 310, it is determined that the input contains selection of an individual search result, the content associated with the selected individual search result is presented in the document viewing window, as indicated at block 314, and the overlay window is hidden from view, as indicated at block 316. In some embodiments, the overlay window hides from view in response to receiving input of an identifier associated with a document in an appropriate field of the document viewing window. For example, if a user inputs a web site address to visit a web site while the overlay window overlays a portion of the document viewing window, the overlay window hides from view so that the user may browse the web site.

After the user completes examination of the presented content, s/he inputs a pre-determined command to indicate that the overlay window is to be re-presented. Receipt of such pre-determined command is indicated at block 318. Subsequent to receiving the pre-determined command, the overlay window is re-presented, as indicated at block 320. In some embodiments, a previously selected individual search result may be visibly marked or otherwise identified, e.g., by highlighting the result or the like. In some embodiments, all previously selected individual search results are visibly identified. In such embodiments, the most recently selected individual search result may be identified differently from the rest of the previously selected individual search results, such that user may readily view where in the list of individual search results s/he left off An example is provided below to illustrate the method described above. Suppose a user who is a high school senior is thinking about applying to colleges to study biology and wants to search for a college that would be right for her. The user starts a web browser from her laptop, goes to her favorite search engine web site (e.g., MSN), and types in a search query with relevant keywords (e.g., "best colleges for studying biology"; "universities with biology departments", etc.).

The search engine receives the search query, runs a search based thereon, and returns a list of hundreds of search results. The list is then presented to the user in an overlay window that overlays the web browser window. At the top of the list, five of the search results are grouped separately from the rest of the search results. The five search results represent five private universities that sponsor the search engine service. The remaining non-sponsored search results are presented following the five sponsored results. The overlay window may be configured such that navigation begins at the first non-sponsored search result by default, if desired.

The user reads through the list of search results and realizes that her search query was too general and broad. The user presses the Escape button to go back to the browser window. The overlay window hides from view in response to pressing the Escape button. The user types in more restricted search query by limiting the geographic areas of her search (e.g., "best colleges for studying biology in the Midwest"). The search engine receives the new query and returns a new list of tens of search results. The new list is again presented in an overlay window.

The user reads through the new list and is immediately attracted to a particular search result at the bottom of the overlay window. The search result has links to the University of Minnesota at Twin Cities. The user then presses and holds the Control (Ctrl) button while simultaneously pressing and releasing the Tab button until a cursor (or a similar indicator) reaches the desired search result. When the cursor reaches the desired search result, the user releases the Tab button to stop the cursor on the desired search result.

Just when the cursor reached the desired search result, a small messenger sign popped up to notify the user that her best friend wishes to chat with her through an instant messenger service. She types in the web address of the messenger service and logs into her messenger account. The overlay window, upon input of the messenger service web address, hides from view. After spending a few minutes chatting with her best friend through the messenger, the user presses the Control and Alternate buttons to return to the search results. The overlay window is re-presented upon receiving the command. The overlay window places the cursor on the particular search result that attracted the user before the user was distracted from navigating within the list of search results such that the user can begin where she left off.

The particular search result contains three links to different web sites. The first link contains the web address for the home page of the University of Minnesota. The second link contains the web address for the home page of the Biology Department of the University at Twin Cities campus. The third link contains the web address for the home page of the Biology Department of the University at Duluth campus. The user then presses the Control and Space buttons to navigate within the particular search result. While still pressing the Control button, the user presses and releases the Space button until the cursor reaches the second link within the particular search result. The user releases the Space button to stop the cursor on the second link. The user then selects the second link by releasing the Control button. Upon the user's selection of the second link within the selected search result, the overlay window hides from view and the browser window presents the home page of the Biology Department at Twin Cities campus.

The user then browses through the department web site. She examines the staff employed in the department. She checks the credentials of the professors in the department. She also reads descriptions of all the biology courses offered by the department. The user finds an email address of the head of the department and decides to email him to ask a few questions. She types in the web address of her email account from the same browser window, logs into her account, and sends a message to the department head. When she wants to navigate the search results further after spending some time in the Biology Department web site, she presses the Control and Alternate buttons. The overlay window is re-presented upon receiving the command. The overlay window places the cursor on the last selected search result (i.e., the second link within the search result for University of Minnesota) such that the user can automatically begin navigating from where she left off, without having to remember where she left off The user can, thereafter, continue navigating within the list of search results, select other search results, and save some of the selected search results in a search folder.

Advantageously, the user can easily navigate through a large number of search results and select many of them by utilizing a set of pre-determined commands that are designed for efficient navigation within, and selection of, search results. The pre-determined commands can be implemented in many different ways that are well-known to those of ordinary skill in the art. Utilizing an overlay window saves display area by occupying no display space. The user can readily return where s/he left off and continue navigating through and selecting from search results.

Advantageously, the method described above may be readily integrated into existing web document viewing windows. In various embodiments, the method may be integrated directly or via a variety of document viewing window extension techniques. Such integration techniques are known to those of ordinary skill in the art and, accordingly, are not further discussed herein.

Figure 4:
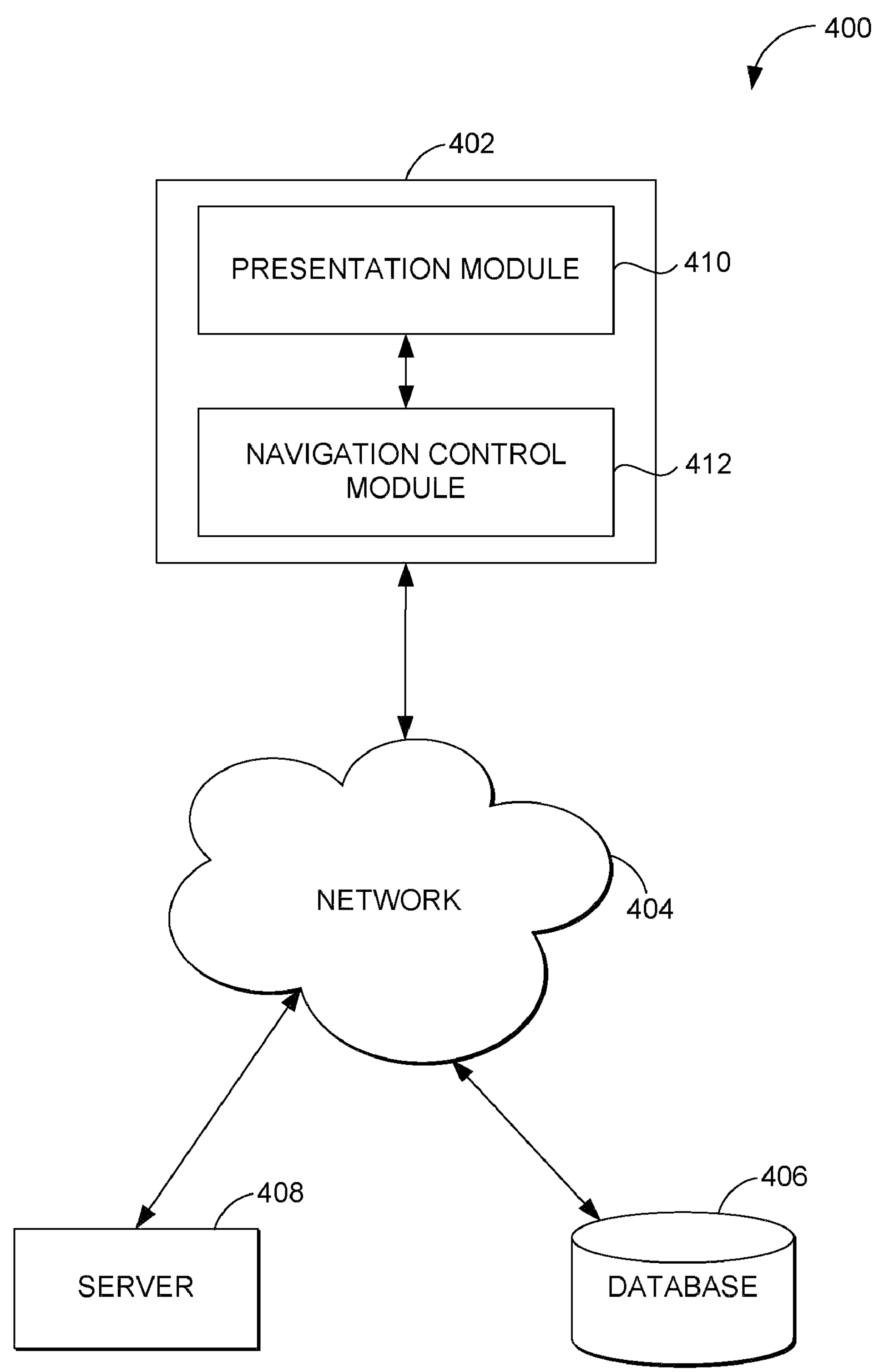
FIG. 4 is a block diagram illustrating an exemplary system for navigating search results in accordance with an embodiment of the present invention.

Turning now to FIG. 4, a block diagram is provided illustrating an exemplary system 400 in which embodiments of the present invention may be employed. Among other components not shown, the system 400 may include a user computing device 402, one or more databases 406, and one or more servers 408, all in communication with one another through a network 404. Each of the user computing device 402 and the server 408 may be any type of computing device, such as computing device 100 described with reference to FIG. 1, for example. Network 404 may include, without limitation, one or more local area networks (LANs) and/or wide area networks (WANs). Such networking environments are commonplace in offices, enterprise-wide computer networks, intranets, and the Internet. It should be understood that any number of user computing devices, servers, databases, and networks may be employed within system 400, any individual component being integrated or separated from any other component, within the scope of the present invention. Additionally, other components not shown may also be included within the system 400. Further, additional components not shown may also be included within each of the user computing device 402, database 406, and server 408. Any and all such variations are contemplated to be within the scope of embodiments hereof.

User device 402 includes a presentation module 410 and a navigation control module 412. The presentation module 410 is configured to present one or more search results in an overlay window in response to receiving a search query. Typically, a search is performed by a search engine based on the search query. In some embodiments, the overlay window overlays at least a portion of a document viewing window. In some embodiments, the list of search results further includes one or more sponsored search results and one or more of non-sponsored search results. In such embodiments, the presentation module 410 may be further configured to present the sponsored search results such that they are visually distinguishable from the non-sponsored search results, e.g., in a different typeface or the like. The presentation module 410, in such embodiments, may be also configured to visibly identify a first non-sponsored search result as an indication that navigation within the plurality of search results will begin with the identified result.

The presentation module 410 is also configured to hide the overlay window from view when one or more of the search results presented in the overlay window are selected. In some embodiments, the presentation module 410 is configured to hide the overlay window from view in response to a pre-determined command for navigating between the overlay window and the document viewing window. In some embodiments, the presentation module 410 is also configured to hide the overlay window in response to input of an identifier associated with a document, such as a web site address to identify a web page.

The presentation module 410 is further configured to re-present the overlay window in response to receiving a pre-determined command. The pre-determined command for re-presenting the overlay window may be the same command as the pre-determined command for presenting the document viewing window when the overlay window is visible or a different pre-determined command, as desired. In some embodiments, the pre-determined command may be a combination of keyboard characters selected simultaneously, a combination of keyboard characters selected in succession, a single keyboard character, a mouse click, or any combination thereof. In some embodiments, the presentation module 410 is configured to visibly identify at least one previously selected search result upon re-presenting the overlay window. In such embodiments, typically, the most recently selected search result is visibly identified distinctly from rest of the previously selected search results. Advantageously, users can, thereby, begin navigating from where they left off.

The presentation module 410 is further configured to present the content associated with a selected search result in the document viewing window. In some embodiments, a search result may be a link to a web site, a document preview, a thumbnail, a video preview sample or a representative icon thereof, an audio sample or a representative icon thereof, or any combination thereof. For example, content of a web site is presented in the document viewing window if the selected search result includes a preview of the web site.

The navigation control module 412 is configured to navigate within the list of search results in the overlay window in response to one or more pre-determined commands. For example, a user may, upon presentation in the overlay window of the list of search results, begin navigating within the list by pressing and releasing the Tab button each time to navigate to a next search result while pressing and holding the Control button or by pressing and release the Tab button each time to navigate to a previous search result while pressing and holding the Control and Shift buttons.

In some embodiments, some of the search results may contain more than one link. For example, a search result may have a link to the home page of a university (e.g., http://www.umkc.edu) and one or more links to different academic departments (e.g., http://www.law.unkc.edu, http://www.unkc.edu/chemistry, etc.). In such embodiments, the navigation module 404 is further configured to navigate within the single search result in response to receiving a pre-determined command. Such command may be the same command or a different command than the pre-determined command for navigating among individual search results, as desired. Returning to the above example, the user may navigate to a search result having multiple links therein by pressing and holding the Control button while pressing and releasing the Tab button. Once the user reaches a particular desired search result, the user may, while pressing and holding the Control button, press and release the Space button to navigate within the particular search result.

It will be understood and appreciated by those of ordinary skill in the art that the particular pre-determined commands described herein are presented by way of example only and are not intended to limit the scope of embodiments of the present invention in any way.

Embodiments of the present invention provide systems, methods and computer-readable media for navigating search results. The systems and methods disclosed herein improve the efficiency of web searching by providing, among other things, a more efficient way to navigate within and select from a list of search results and a more efficient way to return to the list, if desired.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A computer-implemented method for navigating search results using one or more of a processor and computer storage media, the method comprising:

receiving a search query, wherein the search query is received after being input by a user into a web browser;

in response to the search query, creating and presenting a separate overlay window having a plurality of individual search results presented therein;

receiving a selection of one of the plurality of individual search results presented in the overlay window;

presenting, in a document viewing window, content associated with the selected one of the plurality of individual search results, wherein upon such presentation, the overlay window is hidden from view;

receiving a first pre-determined command to re-present the overlay window;

in response to the received first pre-determined command, re-presenting the overlay window presenting the plurality of individual search results such that the overlay window overlays at least a portion of the document viewing window, wherein prior to said re-presentation the overlay window is hidden from view;

visibly distinguishing an individual search result for selection in the overlay window;

receiving a second pre-determined command to visibly distinguish an alternative individual search result; and responsive to receiving a second pre-determined command, visibly distinguishing the alternative individual search result for selection in the overlay window.

2. The method of claim 1, wherein the web browser and the document viewing window are the same window.

3. The method of claim 1, wherein the at least one individual search result includes a plurality of links, and wherein the method further comprises navigating among the plurality of links in response to a second pre-determined command.

* * * * *